United States Patent Office 2,719,175
Patented Sept. 27, 1955

2,719,175

VAPOR PHASE PREPARATION OF N-SUBSTITUTED ACRYLAMIDES

Harry W. Coover, Jr., and Newton H. Shearer, Jr., Kingsport, Tenn., assignors to Eastman Kodak Company, Rochester, N. Y., a corporation of New Jersey No Drawing. Application November 1, 1952,
Serial No. 318,326

6 Claims. (Cl. 260—561)

The present invention relates to a vapor phase process for the preparation of N-substituted acrylamides from acrylic esters and primary or secondary amines. The invention is specifically concerned with the prepartion of N-substituted acrylamides of the formula:

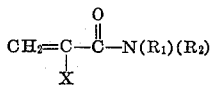

wherein X is hydrogen or a methyl radical and $R_1$ and $R_2$ are hydrogen or alkyl or aryl radicals, at least one being an alkyl or aryl radical. The N-substituted acrylamides prepared in accordance with the present invention are useful materials for polymerizations, particularly for copolymerizations and "graft" polymerizations to give unique properties to the product.

N-substituted acrylamides have been prepared in liquid phase operations by the reaction of acrylic esters with primary and secondary amines. With the exception of the aqueous medium process disclosed and claimed in Greene and Hagemeyer application Serial No. 279,913 filed April 1, 1952, now abandoned, it is known that in these liquid phase reactions the amine reacts first by addition to the double bond of the acrylic ester and subsequently by aminolysis, continued reaction serving to remove the first-added molecule of amine and restore the double bond. Because of the reaction mechanics in the usual liquid phase operations, best results always have required the use of an excess of the amine. In any event, substantial amounts of the addition products always are found as impurities in the reaction. Prior investigations in the vapor phase have indicated that reaction mechanics are the same as in the liquid phase. That is to say, it was found that vapor phase reaction first produces the addition product with the second mole of amine reacting by aminolysis, further reaction restoring the double bond to form the desired N-substituted amine. In the vapor phase operations addition products have been found in large quantities as impurities, presumably formed in the same manner in which they result from liquid phase operations. Furthermore, vapor phase operations conducted at high, i. e. more favorable, temperatures are known to promote formation of polymers due to the tendency of the acrylic double bond to polymerize. Thus, even in liquid phase operations where high temperatures were to be encountered, it has been necessary to reduce the amount of polymerization by the use of polymerization inhibitors.

It is an object of the invention to provide a process for the preparation of N-substituted acrylamides from the corresponding acrylic esters and primary or secondary amines which process is suitable for continuous operation techniques and has the practical result of direct conversion of the esters to their corresponding aminolysis products whereby formation of substantial amounts of by-product impurities such as β-aminoesters, β-aminoamides and polymeric compounds is obviated. A further object is the provision of an efficient catalyst for said process. Still another object of the invention is the development of an improved vapor phase procedure for the conversion of acrylic esters to the corresponding N-substituted acrylamides. Other objects will be evident from the accompanying specification and claims.

We have now discovered that vapor phase reaction between primary and secondary amines and acrylic esters may be conducted under certain critical conditions, i. e. reaction temperatures of 300°–500° C. and corresponding reaction periods of less than ten seconds whereby the reaction mechanics is, or at least appears to be distinctly different from that heretofore encountered. We have found that operations within the critical range of limits results in a reaction in which the N-substituted amide is obtained directly, i. e. without noticeable formation of the addition products. By the term "corresponding reaction periods" as used above, we mean that within the critical limits the time and temperature normally are somewhat complementary. By our novel procedure it becomes unnecessary to use excessive amounts of amine. At the same time, the reaction may be operated on a continuous basis and the conditions of the reaction do not result in excessive polymerization requiring the employment of inhibitors.

In accordance with the most advantageous embodiment of our invention the reaction of acrylic esters with primary and secondary amines is carried out at a temperatures of 300°–550° for a period of time less than ten seconds. The reaction is represented by the following equation:

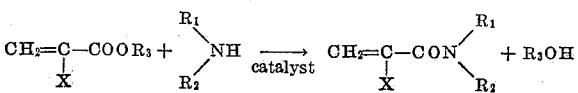

wherein:

X is a member of the group consisting of hydrogen and a methyl radical, $R_1$ is a member of the group consisting of a hydrogen atom, an alkyl radical and an aryl radical, $R_2$ is a member of the group consisting of an alkyl radical and an aryl radical, $R_3$ is a member of the group consisting of a methyl radical and an ethyl radical and the catalyst is one of the group hereinafter described.

The presence of a catalyst in the reaction zone is required for economically feasible results. A wide variety of catalytic materials may be employed. One or more of the following materials may be used: alumina pellets or lumps, vanadia-alumina, silica gel, alumina-silica (e. g. Universal Oil Products Company Type A cracking catalyst), phosphotungstic acid-silica gel, aluminum phosphate on alumina, Berl saddles and charcoal. The Berl saddles and the charcoal are less efficient and require higher reaction temperatures. The most advantageous catalysts are alumina-containing materials from the group comprising alumina, aluminum phosphate on alumina, and vanadia-alumina (e. g. Harshaw V–223).

A molar ratio of acrylate to amine preferably within the range of 1:0.1 to 1:2 usually is established. A contact time of 1 to 7 seconds is most advantageous.

The invention is illustrated in the following examples:

Example 1.—N-methylmethacrylamide

Reactants in the ratio of 1 mole of methylmethacrylate to .53 mole of anhydrous methyl amine were passed over a vanadia-alumina catalyst at a temperature of 375° C. with a contact time of 2.7 seconds. Hydroquinone (1/10 percent) was added to the product. By distillation at 1 mm. pressure, a fraction comprising N-methylmethacrylamide was collected at 68–73° C. The conversion based on methylamine used was 49 percent. After distillation, the amide still contained small quantities of basic and acidic impurities. Purification was effected with ion exchange resins (e. g. Amberlite IR–120 and IRA–400). On a second sample of a similarly prepared product, purification was achieved by washing a benzene solution of the amide, first with 2 percent aqueous hydrochloric acid saturated with salt, then with 3 percent aqueous sodium hydroxide saturated with salt followed by drying and redistillation.

*Example 2.—N,N-dimethylacrylamide*

Reactants in the ratio of 1 mole of methylacrylate to 1 mole dimethylamine were passed over activated alumina lumps at 450° C. with a contact time of 1.7 seconds. Conversion was 54 percent to N,N-dimethylacrylamide, which was collected by distillation at 50–55° C. at 1 mm.

*Example 3.—N-ethylmethacrylamide*

Reactants in the ratio of 1 mole of methylmethacrylate to 2 moles of ethylamine were passed over activated alumina lumps at 550° C.; contact time, one second. Upon distillation, N-ethylmethacrylamide was collected at 76–80° C. at 1 mm.

*Example 4.—N-isopropylacrylamide*

An aluminum phosphate-alumina catalyst was prepared by mixing 1 part by weight of 85 percent phosphoric acid with four parts of activated alumina pellets; then heating at 250° C. for 2 hours. Reactants in the ratio of 1 mole methacrylate to 0.6 mole isopropyl amine were passed over this aluminum phosphate-alumina catalyst at 400° C.; contact time, 2.8 seconds. N-isopropylacrylamide was collected at 89–92° C. at 2 mm.

*Example 5.—N-cyclohexylacrylamide*

Reactants in the ratio of 1 mole of ethylacrylate to 7 moles of cyclohexylamine were passed over the catalyst described in Example 4 at 415° C.; contact time, 4 seconds. Resulting N-cyclohexylacrylamide was collected at 109–112° C. at 1 mm.

*Example 6.—N-phenylmethacrylamide*

Reactants in the ratio of 1 mole of methylmethacrylate to 0.8 mole of aniline were passed over a catalyst prepared as described in Example 4 at 475° C.; contact time, 4 seconds. Resulting N-phenylmethacrylamide was distilled off at 115–118° C. at 1 mm.

We claim:
1. A process for the preparation of N-substituted acrylamides of the formula:

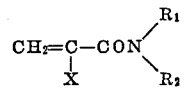

wherein X is a member of the group consisting of a hydrogen atom and a methyl radical, $R_1$ is a member of the group consisting of a hydrogen atom and lower alkyl, cyclohexyl, and phenyl radicals, and $R_2$ is a member of the group consisting of lower alkyl cyclohexyl and phenyl radicals, said process comprising reacting an acrylic ester of the formula:

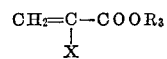

wherein X has the above-defined meaning and $R_3$ is a member of the group consisting of methyl and ethyl radicals, with an amine of the formula:

wherein $R_1$ and $R_2$ are as defined above, in the vapor phase at a temperature within the range of 300–550° C. for a contact time of less than ten seconds in the presence of a catalyst containing a substantial amount of alumina.

2. A method of producing N-methylmethacrylamide which comprises heating methylmethacrylate with methyl amine in the vapor phase at a temperature within the range of 300–550° C. for a period of less than ten seconds in the presence of a vanadia-alumina catalyst to form methyl alcohol and N-methylmethacrylamide, and recovering the latter.

3. A method of producing N,N-dimethylacrylamide which comprises heating methylacrylate with dimethylamine in the vapor phase at a temperature within the range of 300–550° C. for a period of less than ten seconds in the presence of alumina to form methyl alcohol and N,N-dimethylacrylamide, and isolating the latter.

4. A method of producing N-ethyl methylacrylamide which comprises heating methylmethacrylate with ethyl amine in the vapor phase at a temperature within the range of 300–550° C. for a period of less than ten seconds in the presence of alumina.

5. A method of producing N-isopropylacrylamide which comprises heating methylacrylate with isopropyl amine in the vapor phase at a temperature within the range of 300–550° C. for a period of less than ten seconds in the presence of aluminum phosphate on alumina.

6. A method of producing N-cyclohexylacrylamide which comprises heating ethyl acrylate with cyclohexyl amine in the vapor phase at a temperature within the range of 300–550° C. for a period of less than ten seconds in the presence of aluminum phosphate on alumina.

References Cited in the file of this patent
UNITED STATES PATENTS

| | | |
|---|---|---|
| 2,120,933 | Dittmar | June 14, 1938 |
| 2,529,838 | Erickson | Nov. 14, 1950 |